US012600335B2

(12) United States Patent
Seminara et al.

(10) Patent No.: US 12,600,335 B2
(45) Date of Patent: Apr. 14, 2026

(54) TRAILER BRAKING THROUGH TRAILER SUPPLY LINE

(71) Applicant: Outrider Technologies, Inc., Golden, CO (US)

(72) Inventors: Gary Seminara, Golden, CO (US); John Keith Massie, Golden, CO (US); Lawrence S. Klein, Bend, OR (US)

(73) Assignee: Outrider Technologies, Inc., Brighton, CO (US)

( * ) Notice: Subject to any disclaimer, the term of this patent is extended or adjusted under 35 U.S.C. 154(b) by 849 days.

(21) Appl. No.: 18/047,564

(22) Filed: Oct. 18, 2022

(65) Prior Publication Data

US 2023/0118873 A1 Apr. 20, 2023

Related U.S. Application Data

(60) Provisional application No. 63/257,924, filed on Oct. 20, 2021.

(51) Int. Cl.
*B60T 13/26* (2006.01)
*B60T 17/18* (2006.01)

(52) U.S. Cl.
CPC ............ *B60T 13/265* (2013.01); *B60T 17/18* (2013.01)

(58) Field of Classification Search
CPC ........ B60T 13/265; B60T 17/18; B60T 13/26; B60T 13/38; B60T 13/40; B60T 7/20; B60T 8/32; B60T 15/04
See application file for complete search history.

(56) References Cited

U.S. PATENT DOCUMENTS

| | | | |
|---|---|---|---|
| 2,922,678 A | * | 1/1960 | Schultz .................. B60T 15/20 |
| | | | 303/29 |
| 4,017,125 A | | 4/1977 | Durling |
| 4,050,746 A | * | 9/1977 | Durling ................ B60T 13/263 |
| | | | 303/54 |
| 5,242,215 A | | 9/1993 | Krause |
| 7,597,406 B2 | | 10/2009 | Judy, II |
| 9,623,849 B2 | | 4/2017 | Spath et al. |

(Continued)

FOREIGN PATENT DOCUMENTS

| | | |
|---|---|---|
| DE | 1655717 A1 | 3/1971 |
| EP | 0005648 A1 | 11/1979 |

(Continued)

OTHER PUBLICATIONS

International Patent Application No. PCT/US2022/047023 International Preliminary Report on Patentability dated Jul. 11, 2024, 13 pages.

(Continued)

*Primary Examiner* — Vishal R Sahni
(74) *Attorney, Agent, or Firm* — Cozen O'Connor

(57) ABSTRACT

Systems and methods allow for controlling brakes of a trailer coupled to a tractor. The systems and methods utilize an inversion valve input between an emergency brake controller and a trailer connection at the tractor. The inversion valve receives a supply air from an output of the emergency brake controller, and a control air output from a treadle valve of the tractor. Depending on the control air, the emergency brakes at the tractor may be released/activated to simulate service brake control without requiring connecting the tractor to the trailer service brake line.

20 Claims, 7 Drawing Sheets

(56)                     References Cited

U.S. PATENT DOCUMENTS

| 11,099,560 B2 | 8/2021 | Smith et al. |
| 2010/0078278 A1 | 4/2010 | Hurlburt et al. |
| 2017/0174197 A1 | 6/2017 | Eberling et al. |
| 2020/0139950 A1 | 5/2020 | James et al. |

FOREIGN PATENT DOCUMENTS

| EP | 3789255 A1 | 3/2021 |
| JP | H08295214 A | 11/1996 |

OTHER PUBLICATIONS

International Patent Application No. PCT/US2022/047023 International Search Report and Written Opinion dated Mar. 14, 2023, 10 pages.
Extended European search report for European Application No. 22884358.7, dated Jul. 25, 2025, 10 pages.

\* cited by examiner

200

Service Brake
Chamber

Spring Brake
Chamber

208

218

210

207

216

206

214

202

204

No Parking or Service Brakes Applied

200

Service Brake
Chamber Vented

208

218

210

207

216

206

214

202

204

Parking Brake Spring Force Applied
(Spring Brake Chamber Vented)

602

Exhaust

714
Piston
Spring

708

724

720

710

704
½″ P.T.
Control

Piston
O-Ring

726

Body

712

706
¼″ P.T.
Delivery

716

728
Valve Spring

702
¼″ P.T.
Supply

TRAILER BRAKING THROUGH TRAILER SUPPLY LINE

CROSS-REFERENCE TO RELATED APPLICATIONS

This application claims priority to and benefits from U.S. Provisional Patent Application Ser. No. 63/257,924, filed Oct. 20, 2021, and entitled "Trailer Braking Through Trailer Supply Line." The aforementioned application is incorporated by reference in its entirety as if fully set forth herein.

BACKGROUND

A tractor physically couples to a trailer to move it. To couple to the trailer, two air-lines and an electrical line are coupled to the trailer at designated connection points. FIG. 1 shows a prior-art schematic diagram 100 of the air-line circuit for controlling the brakes of the tractor 102 and the trailer 104.

Tractor 102 includes driver/passenger front service brakes 106(D), 106(P), and driver/passenger rear service brakes 108(1,D), 108(2,D), 108(1,P), and 108(2,P). Service brakes 106(D), 106(P), 108(1,D), 108(2,D), 108(1,P), and 108(2,P) are air-powered brakes, in that air within reservoirs 110(1)-(3), as generated from compressor 112, is routed, depending on the configuration of one or more of treadle valve 114, emergency brake control 116, and parking brake control 118. Service brakes 108(1,D), 108(2,D), 108(1,P), and 108(2,P) are spring brakes, in that, not only are they air-powered, but there is also a spring that actuates the brakes into place when air is not supplied thereto (often referred to as a "piggy back spring").

Treadle valve 114 is the brake pedal in the tractor 102 that, when actuated, sends air into the service brakes 106(D), 106(P), 108(1,D), 108(2,D), 108(1,P), and 108(2,P) to actuate the brake and cause the tractor 102 to stop/decelerate. Emergency brake control 116, and parking brake control 118 also control service brakes 106(D), 106(P), 108(1,D), 108(2,D), 108(1,P), and 108(2,P) to actuate when in an "off" or "park" setting, either via air control, or via manual actuation of the spring brake of the service brakes.

When the tractor 102 is coupled to the trailer 104 via a service brake line 120 and emergency brake line 122 (often referred to as a "trailer supply line"), treadle valve 114, emergency brake control 116, and parking brake control 118 also operate the driver/passenger trailer brakes 126(1,D), 126(2,D), 126(1,P), and 126(2,P). Driver/passenger trailer brakes 126(1,D), 126(2,D), 126(1,P), and 126(2,P) are also air brakes, in that air within trailer reservoir(s)/brake control 128, as generated from compressor 112, is routed, depending on the configuration of one or more of treadle valve 114, emergency brake control 116, and parking brake control 118.

FIG. 2 shows a prior art spring brake 200 in a configuration where the brakes are not applied. FIG. 3 shows the prior art spring brake 200 in a configuration where the brakes are applied via an emergency/parking brake application. FIG. 4 shows the prior art spring brake 200 in a configuration where the brakes are applied via a service brake application. The spring brake 200 includes a service brake chamber portion 202 and a spring brake chamber portion 204. The brake may be applied using either the service brake chamber portion 202 or the spring brake chamber portion 204. Spring brake 200 is an example of typical brake systems on a trailer (e.g., trailer 504, discussed below). Thus, while spring brake 200 itself may be prior-art, the embodiments herein as discussed in further detail below describe a novel system and method for controlling trailer brakes, such as those trailers 504 including spring brakes similar to spring brake 200. Accordingly, operation of spring brake 200 is described below and, although known, pertinent to the present novel embodiments.

Service brake chamber portion 202 includes a service brake diaphragm 206, a service-brake-chamber return spring 208. As shown in FIG. 4, when the parking and emergency brakes are off, air input (via the service brake line 120) into the service brake chamber portion 202 pushes the service brake diaphragm 206 towards the slack adjuster 207 which, because it is coupled to the pushrod 210 and the brake pads (not shown), applies the brakes. If air is not input into the service brake chamber portion 202, then a service-brake-chamber return spring 208 pushes the service brake diaphragm 206 back away from the slack adjuster which releases the brakes.

Spring brake chamber portion 204 includes a spring brake diaphragm 214, a spring-brake-chamber spring 216, and a service-brake-chamber return spring 218. As shown in FIG. 3, when air (as supplied from the emergency brake line 122) is not input into the spring brake chamber portion 204 (such as when the vehicle is turned off, the parking brake control is engaged, or the emergency brake control is engaged), then the spring-brake-chamber spring 216, which has a larger spring force than both of the service-brake-chamber return spring 208 and the service-brake-chamber return spring 218, applies force to move the pushrod 210 towards the slack adjuster 207 and apply the brakes. However, when air is input into the spring brake chamber portion 204, such as when the emergency brake and parking brakes are turned off, then the spring-brake-chamber spring 216 is compressed which in turn releases the brakes.

Referring back to FIG. 1, service brake line 120 couples between the tractor 102 and trailer 104 via first tractor connection 130(1) located on the tractor 102 and first trailer connection 132(1) located on the trailer 104. Emergency brake line 122 couples between the tractor 102 and trailer 104 via second tractor connection 130(2) located on the tractor 102 and second trailer connection 132(2) located on the trailer 104. Tractor connections 130 and trailer connections 132 may be gladhand connections (or some other connection type as known in the art or used in the tractor/trailer industry).

Actuation of treadle valve 114 routes air from reservoir(s) 110 through check valve 134, first tractor connection 130(1), service brake line 120, first trailer connection 132(1), to the trailer reservoir(s)/brake control 128 which, in turn, actuates trailer brakes 126(1,D), 126(2,D), 126(1,P), and 126(2,P) by putting air into the service brake chamber portion 202 which pushes the pushrod 210 towards the slack adjuster to apply the brakes. When treadle valve 114 is not actuated, air is not routed to the trailer brakes and thus the trailer brakes are not actuated because air is not input into the service brake chamber portion 202.

Turning emergency brake control 116 to "off" (e.g., to release the emergency brakes) routes air from reservoir(s) 110 through second tractor connection 130(2), emergency brake line 122, second trailer connection 132(2), to the trailer reservoir(s)/brake control valves 128 which, in turn, releases trailer brakes 126(1,D), 126(2,D), 126(1,P), and 126(2,P) by putting air into the spring brake chamber portion 204 and compressing the spring-brake-chamber spring 216 causing the pushrod 210 to release the brakes. When emergency brake control 116 is "on", air is not routed to the trailer brakes and thus the trailer brakes are actuated because spring-brake-chamber spring 216 pushes pushrod 210 towards slack adjuster to apply the brakes.

SUMMARY

In many situations when moving a trailer around a yard, such as for loading and unloading, only the emergency air line is coupled to the trailer such that the trailer brakes are released. However, when only using the emergency line, pushing on the brake treadle valve in the tractor only activates the brakes of the tractor and not the trailer. That is, when only the emergency line is connected, the tractor cannot control the brakes of the trailer, which are always released. This is a safety concern, particularly when the trailer is heavily loaded. The present embodiments realize that, when maneuvering the trailer within the yard with only the emergency air line connected, it would be advantageous to control the trailer brakes (e.g., trailer brakes 126(1,D), 126(2,D), 126(1,P), and 126(2,P)) without connecting the service brake line 120 between first tractor connection 130(1) and first trailer connection 132(1). Advantageously, the present embodiments solve this problem by inserting an inversion valve between the emergency brake control 116 and the first tractor connection 130(1), that is controlled via a supply signal derived from the treadle valve 114. This configuration provides the advantage of regulating the pressure supplied of emergency brake line 122 in response to activation of the tractor service brakes to simultaneously apply the trailer brakes without any need to coupled a service brake line between tractor 102 and trailer 104.

This advantage is amplified in situations such as autonomous yard vehicles in which an autonomous yard vehicle autonomously couples the gladhand of the autonomous yard vehicle to the connector of the trailer. In such situations, because the trailer is not being driven over the road, and typically at slow speeds, it is common to not couple the service brake line to the trailer (e.g., to control the trailer service brakes 126(1,D), 126(2,D), 126(1,P), and 126(2,P)), but instead rely on tractor brakes alone. However, the embodiments herein provide operation of the trailer service brakes through coupling of only the emergency brake line. This further reduces the complexity for autonomous yard tractors since only one gladhand connection is used to safely move the trailer.

In one embodiment, a system for controlling trailer brakes, includes: an emergency brake control that activates and releases an emergency brake of a trailer, a treadle valve that receives input from a pedal to output a control air that activates and releases a service brake of a tractor, and a trailer brake controller coupled between the emergency brake control and a trailer connection that, in response to a control signal based off the treadle valve, outputs a delivery signal capable of controlling the emergency brake.

In another embodiment, a method for controlling a brake of a trailer, includes: receiving a supply air output from an emergency brake control of a tractor, receiving a control air output from a treadle valve of the tractor, when the control air is below a valve minimum threshold, outputting a delivery air similar to the supply air from the tractor to the trailer to release the brake, and when the control air is above the valve minimum threshold, outputting the delivery air at a reduced pressure to apply the brake.

DETAILED DESCRIPTION OF THE EMBODIMENTS

Figure 5:
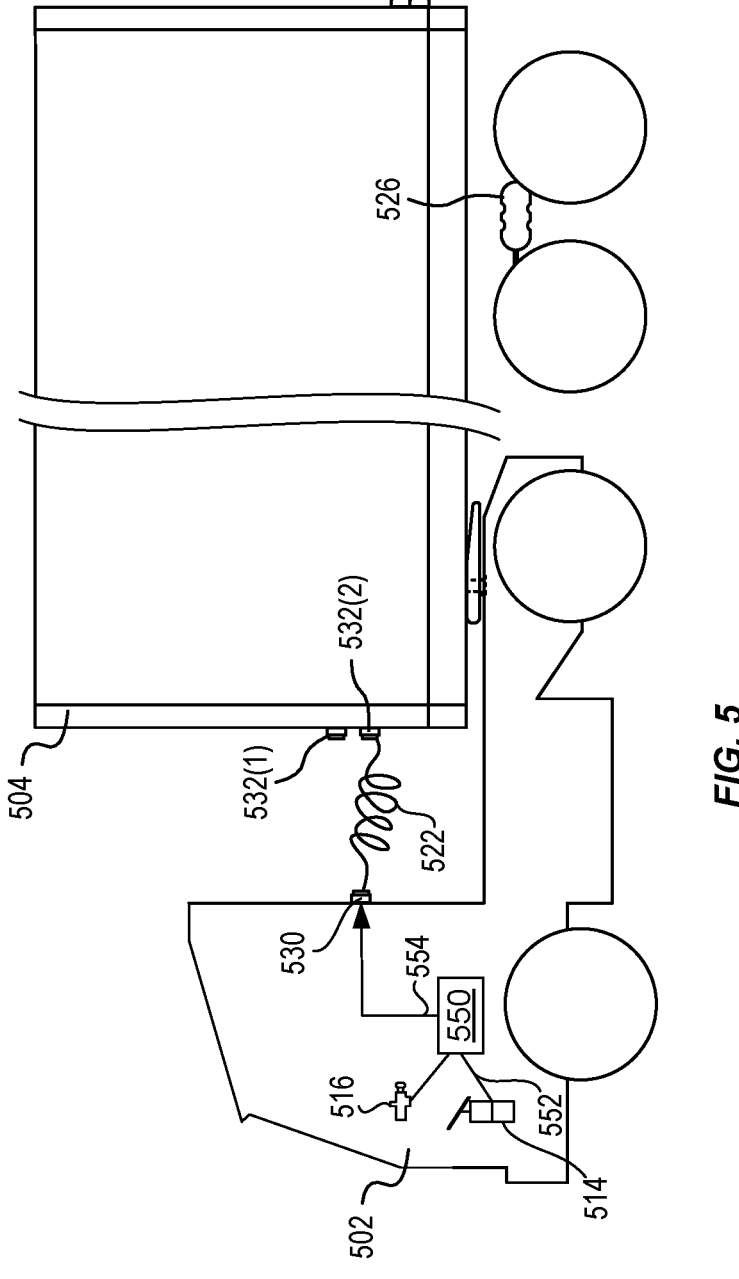
FIG. 5 shows a tractor hitched to a conventional trailer and enhanced to control brakes of the trailer using a single air line, in embodiments.

FIG. 5 shows a tractor 502 hitched to a conventional trailer 504, in embodiments. Tractor 502 may be a conventional trailer tractor that is modified with a trailer brake controller 550 that modifies operation of a conventional trailer brake system using only a single connection therebetween (e.g., single air line 522) to enable control of the emergency brake 526 (which may be, in at least one embodiment, spring brake 200) with only a single air line 522 (e.g., emergency brake line 122). Trailer brake controller 550 is coupled between an emergency brake control 516 and a tractor connection 530 that, in response to a control signal 552 based off a treadle valve 514, outputs a delivery signal 554 capable of controlling the emergency brake 526 of the trailer 504. Tractor 502 may be an autonomous yard vehicle, such as that discussed in U.S. Pat. No. 11,099,560, entitled "Systems and methods for automated operation and handling of autonomous trucks and trailers hauled thereby", filed Feb. 21, 2019, and which is incorporated by reference herein in its entirety as if fully set forth.

Figure 1:
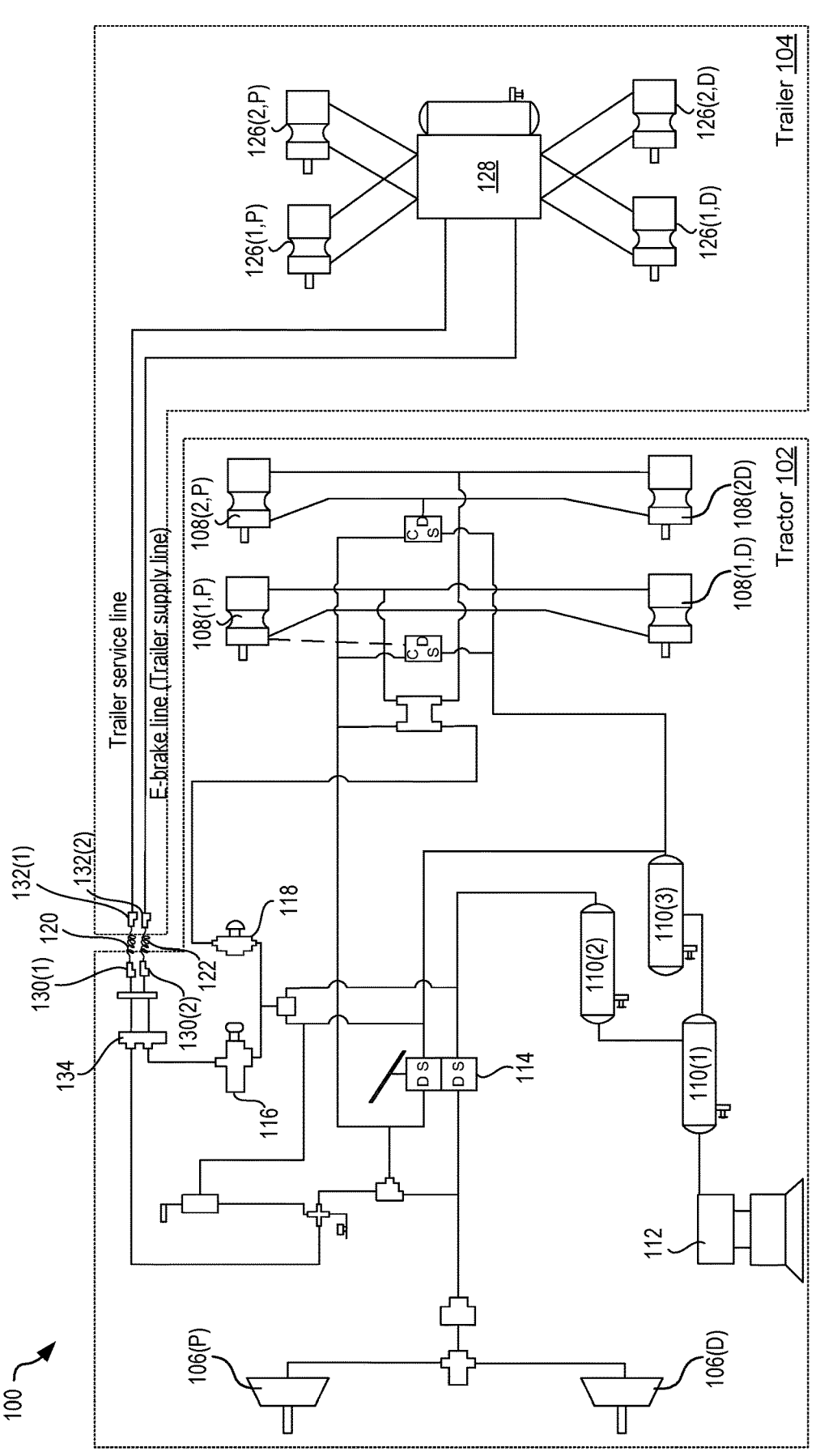
FIG. 1 shows a prior-art schematic diagram of the air-line circuit for controlling the brakes of the tractor and the trailer.

Tractor 502 couples to trailer 504 via tractor connection 530, single air line 522, second trailer connection 532(2). Tractor connection 530 is similar to second tractor connection 130(2) of FIG. 1, above. Single air line 522 is similar to emergency brake line 122 of FIG. 1, above. Second trailer connection 532(2) is similar to second trailer connection 132(2) of FIG. 1, above. Trailer 504 also includes the standard first trailer connection 532(1), which is an example of first trailer connection 132(1) of FIG. 1, above, that is used for trailer service line. In embodiments where the trailer 504 is coupled to the tractor 502 via both connections 532(1) and 532(2), the tractor 502 may include a bypass (e.g., an air bypass valve that bypasses the trailer brake controller 550, or an electronic bypass where the trailer brake controller 550 is operated electronically) that reverts the tractor 502 to standard operation of a tractor/trailer air brake system.

Although not shown, single air line 522 may be autonomously coupled to second trailer connection 532(2) using a robotic arm of the tractor 502. For example, single air line 522 may be autonomously coupled to second trailer connection 532(2) using any one or more of the coupling techniques discussed, for example, in U.S. Pat. No. 11,099, 560, which is incorporated by reference herein.

Figure 2:
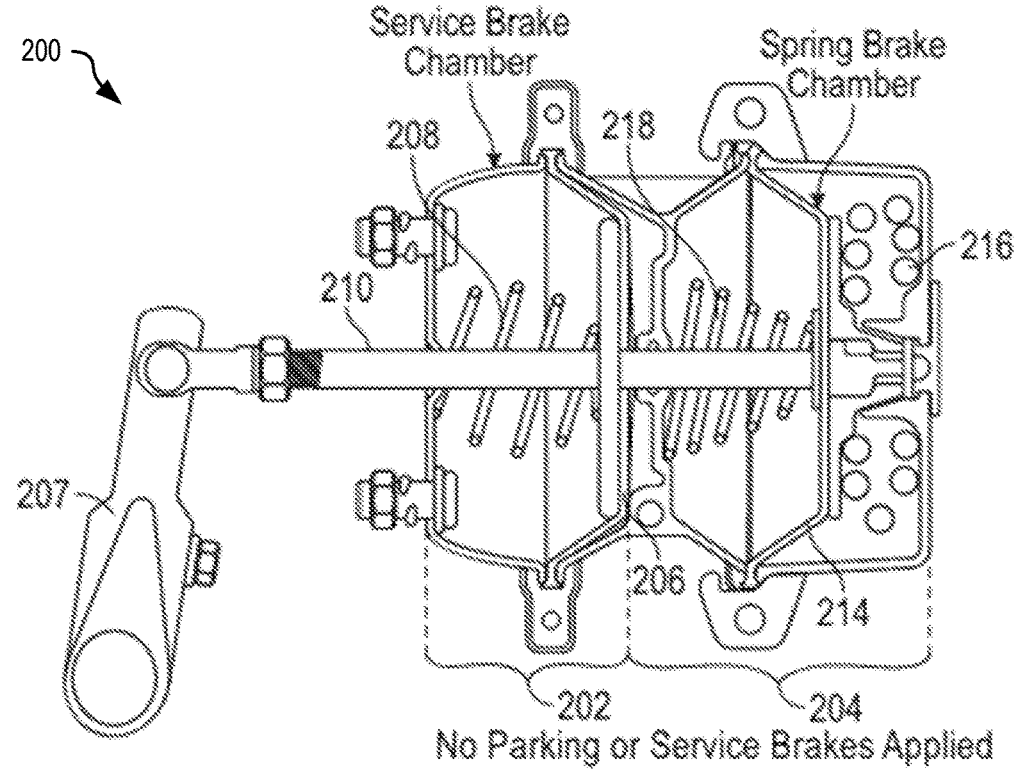
FIG. 2 shows a prior art spring brake in a configuration where the brakes are not applied.
Figure 3:
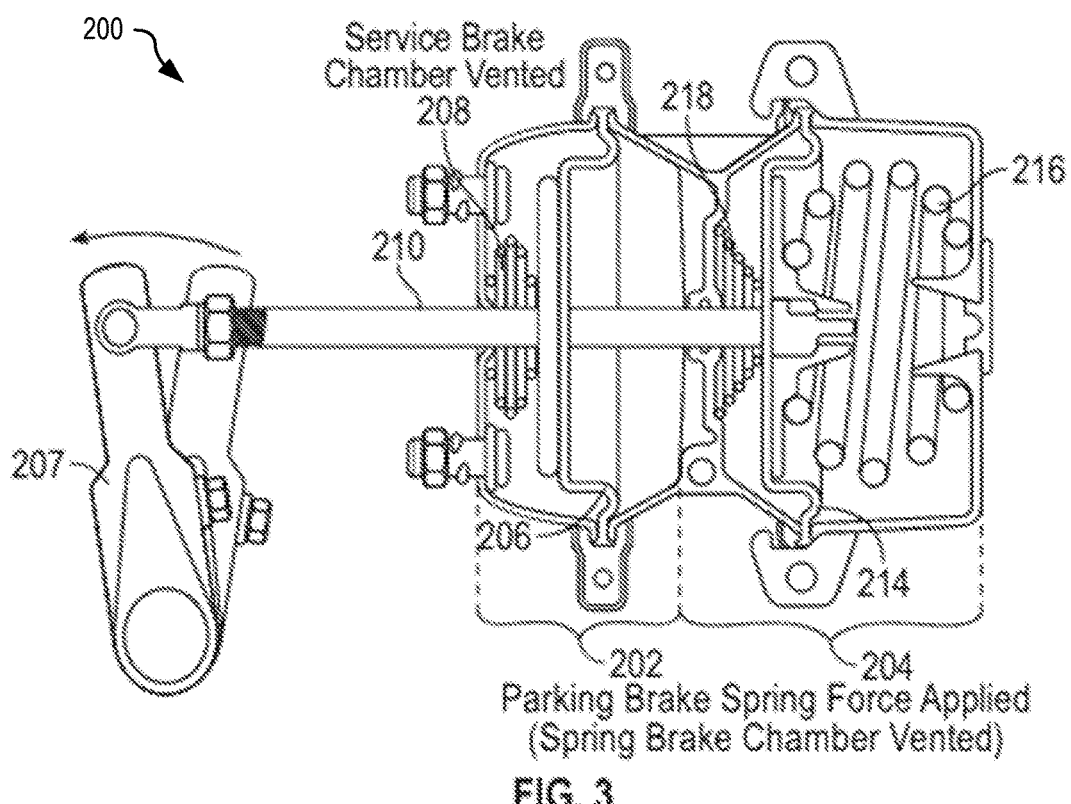
FIG. 3 shows the prior art spring brake in a configuration where the brakes are applied.
Figure 4:
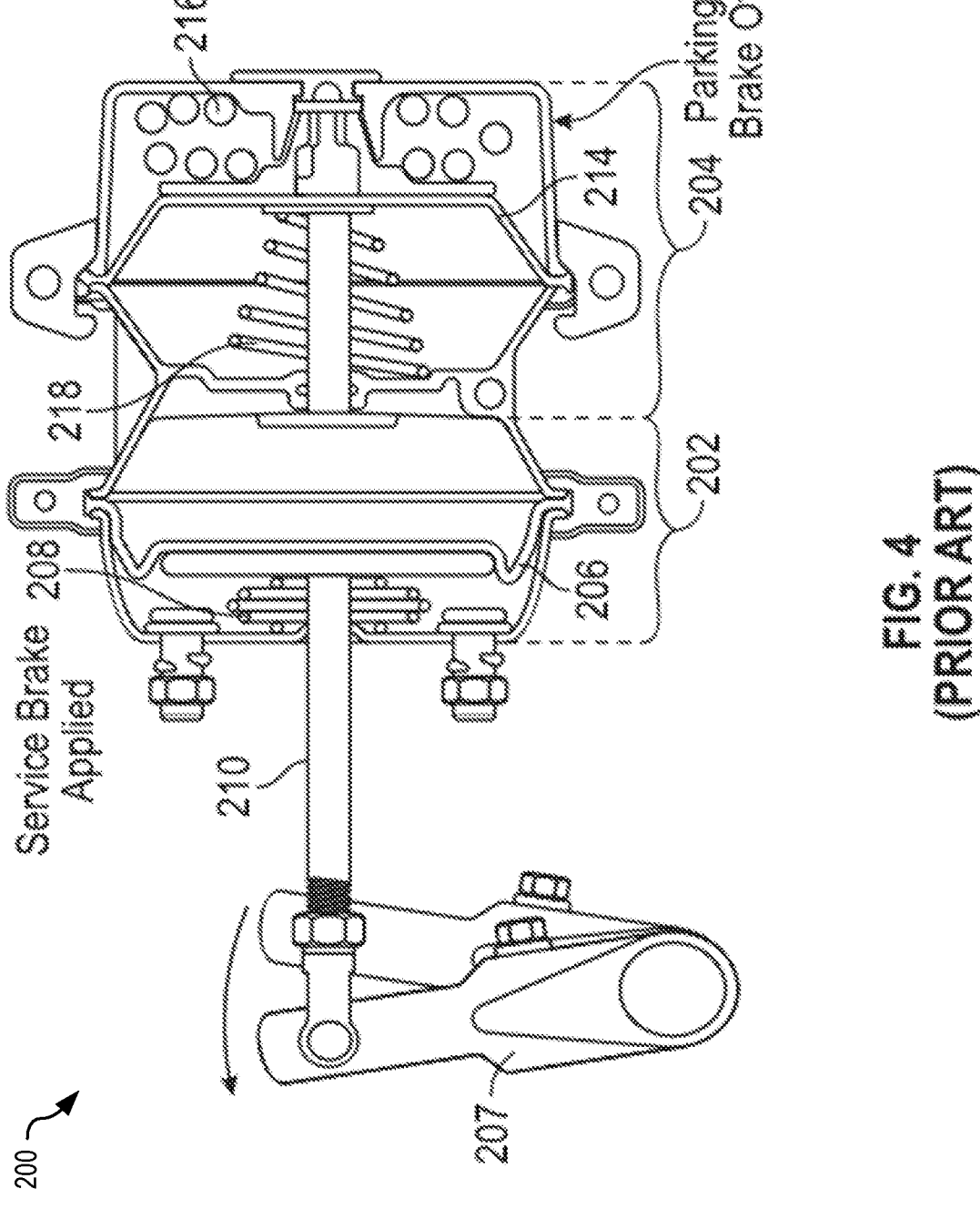
FIG. 4 shows the prior art spring brake in a configuration where the brakes are applied via a service brake application.
Figure 6:
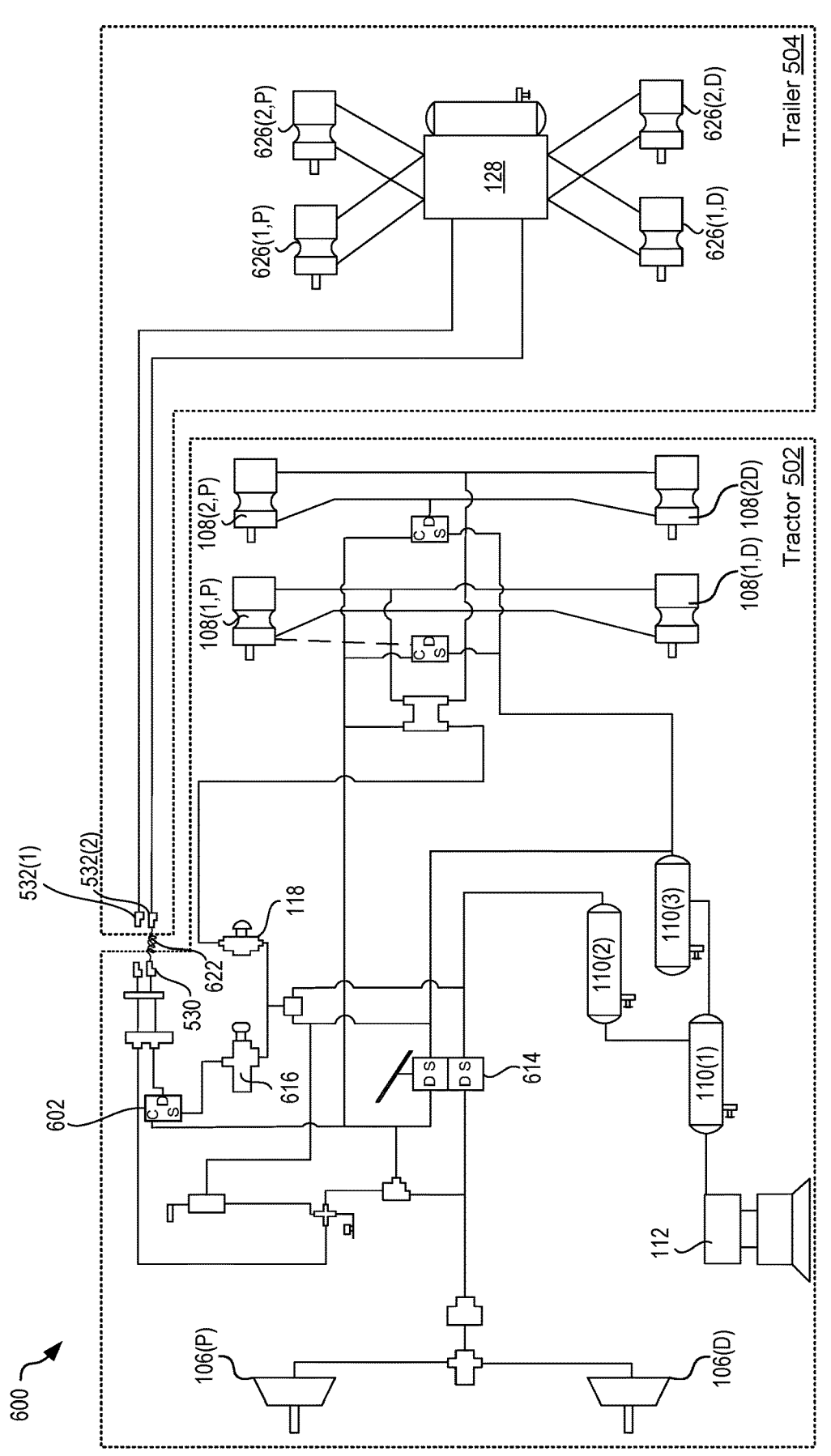
FIG. 6 is a schematic illustrating one example air brake system used by tractor and trailer, of FIG. 5, to operate the trailer brakes with a single air line between the tractor and the trailer, in embodiments.

FIG. 6 is a schematic illustrating one example air brake system 600 used by tractor 502 and trailer 504, of FIG. 5, to operate brakes of trailer 504 using a single air connection between the tractor 502 and trailer 504, in embodiments. Trailer 504 includes spring brakes 626(1,D), 626(2,D), 626 (1,P), and 626(2,P), which are similar to driver/passenger trailer brakes 126(1,D), 126(2,D), 126(1,P), and 126(2,P) discussed above. The spring brakes 200 of FIGS. 2 through 4 are examples of spring brakes 626(1,D), 626(2,D), 626(1, P), and 626(2,P).

The air circuit of tractor 502 is the same as a conventional air circuit but includes an inversion valve 602 inserted therein. Inversion valve 602 is an example of the trailer brake controller 550 discussed above. The trailer brake controller 550 may be other types of controls (such as electronic valves, or other types of valves without departing from the scope hereof). Inversion valve 602 is coupled between the emergency brake control 616 and tractor connection 530 that couples to second trailer connection 532(2) via single air line 522.

Figure 7:
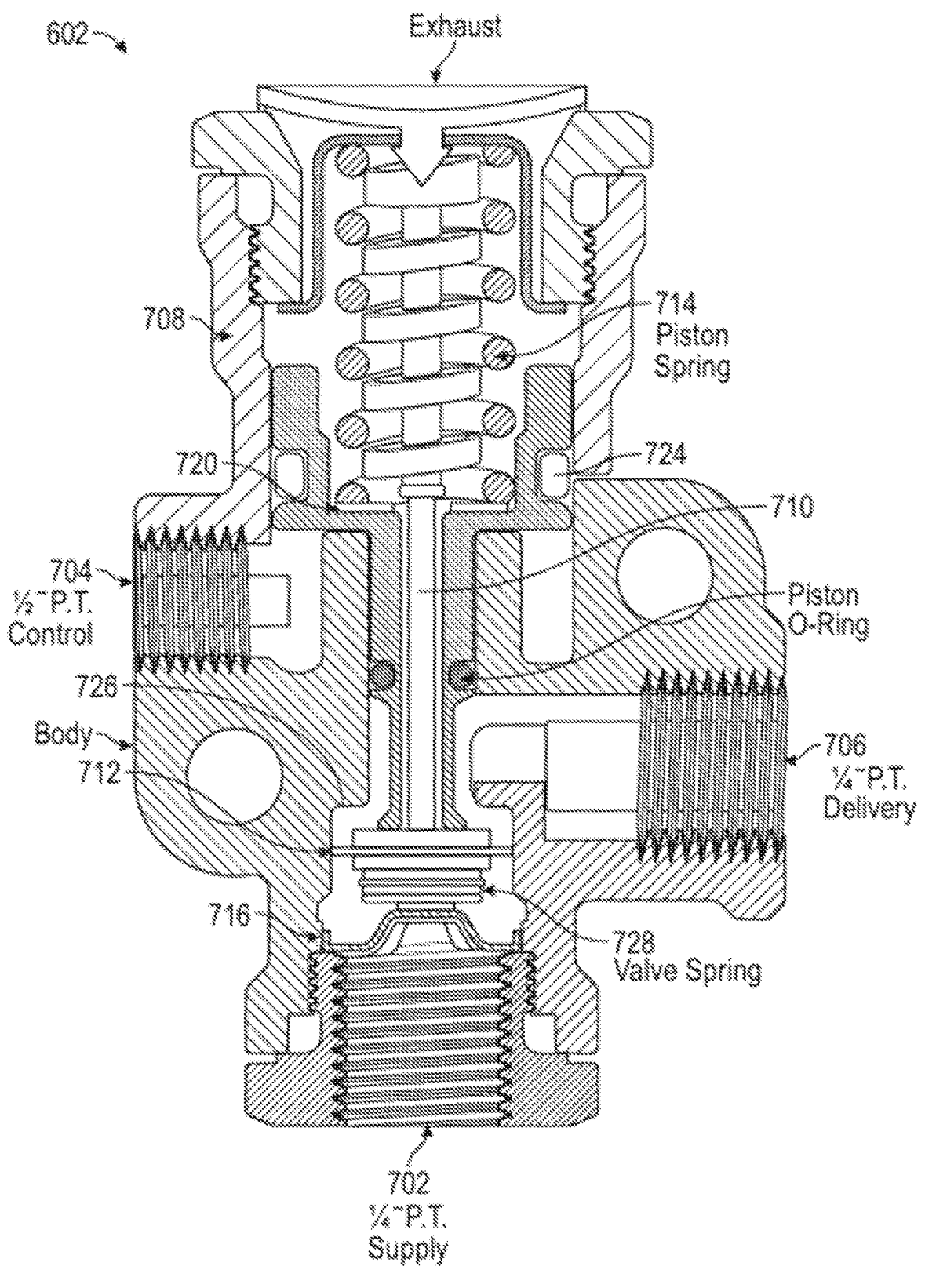
FIG. 7 shows the inversion valve of FIG. 6 in further detail, in embodiments.

FIG. 7 shows the inversion valve 602 of FIG. 6 in further detail, in embodiments. Inversion valve 602 is also referred to in the art as an emergency relay valve. Inversion valve 602 includes a supply port 702, a control port 704, and a delivery port 706. However, the inversion valve 602 is not conventionally used to control air supplied via a single air line of a trailer.

Supply port 702 is coupled to the delivery port (or output of) emergency brake control 616 such that, when emergency brake control 616 is configured in an "off" position (e.g., to release the emergency brakes), air flows from the reservoir (s) 110 (specifically primary air reservoir 110(3), in embodiments) and is supplied to the supply port 702 of the inversion valve. Control port 704 is coupled to the output of the treadle valve 614, which is similar to treadle valve 114, 514 discussed above, such that when the brake pedal of treadle valve 614 is actuated to apply brakes, air is routed from the reservoir(s) 110 (specifically primary air reservoir 110(2), in embodiments) to control port 704. Delivery port 706 is coupled to tractor connection 530 that couples to second trailer connection 532(2) via single air line 522. Output from inversion valve 602 via delivery port 706 controls the spring brakes 626 of trailer 504 via a single air connection between trailer 504 and tractor 502, namely emergency brake line 622 (which is an example of single air line 522).

Inversion valve 602 includes a piston 708 that is coupled via rod 710 to valve 712. Piston 708 is driven by piston spring 714 which applies force on valve 712 via rod 710 to push valve 712 open until valve 712 rests on valve stop 716. Valve 712 is "open" when control-air pressure of air supplied at control port 704 is at or below a predefined supply air threshold (e.g., 20-30 PSI), where the piston spring 714 begins to compress via air pressure pressing against one or more of a shim 720, piston housing, and piston o-ring 724 to enact a compressive force on piston spring 714 that is greater than the spring force of piston spring 714. Valve 712 begins to close as the control-air pressure of air supplied at control port 704 increases more than the predefined supply air threshold. This greater pressure continues to move valve 712 until valve 712 rests against valve seat 726. A valve spring 728 may be included to aid valve 712 in movement towards valve seat 726.

In the "open" position of valve 712, supply-air input into supply port 702 passes through valve 712 and out of delivery port 706. As the valve 712 closes, the pressure of supply-air input into supply port 702 decreases. When valve 712 is closed, the supply-air input into supply port 702 does not pass through inversion valve 602 and out of delivery port 706.

In embodiments, the supply air received at supply port 702 is configurable at the tractor 502. For example, the tractor 502 may set its maximum air pressure output from emergency brake control 516 to one-hundred and thirty PSI, which is at or below the max pressure of the emergency brakes 526, but at or above the minimum pressure required to compress the spring-brake-chamber spring 216 (e.g., 80-90 PSI).

In an embodiment, the amount of decrease as the valve 712 closes may be a linear curve. For example, when supply air received at the supply port 702 and control air input into the control port 704 are both one-hundred and thirty PSI, the output of delivery port 706 may be 0 PSI (e.g., the output is inverse to the control port 704). Similarly, when the supply air received at the supply port 702 is zero (e.g., no actuation of treadle valve 614), the output of delivery port 706 may be one-hundred and thirty PSI (the amount of the supply port 702). This curve may differ depending on the type and model of the trailer brake controller 550.

The output of delivery port 706 controls whether the brakes of the trailer are applied. Referring to FIG. 1-4, because no air is being supplied from the service brake line 120, the service brake diaphragm 206 is "closed" and thus brakes are not applied via the service brake chamber portion 202 of spring brakes 626(1,D), 626(2,D), 626(1,P), and 626(2,P) of trailer 504. However, the output of delivery port 706 controls the amount of air that is input into spring brake chamber portion 204 and thus compression/decompression of spring-brake-chamber spring 216 to release/apply the brakes.

Where delivery-air pressure of delivery air output from delivery port 706 is at or below a brake-spring threshold value, which does not apply force on spring brake diaphragm 214 to compress spring-brake-chamber spring 216, the spring-brake-chamber spring 216 decompresses to apply the brakes. The delivery-air pressure of delivery air output from delivery port 706 is at or below the brake-spring threshold value when either (1) the supply-air pressure of supply-air incoming to the supply port 702 is at or below a brake-spring threshold value (e.g., when the emergency brake control 616 is "on", there is a failure), or (2) the control-air pressure of control-air input into control port 704 is at or above a valve maximum threshold that causes valve 712 to close.

Where the delivery-air pressure output from delivery port 706 is above the brake-spring threshold value, which in turn when delivered via delivery port 706 applies force on spring brake diaphragm 214 to compress spring-brake-chamber spring 216, the spring-brake-chamber spring 216 is compressed and the brakes are released. The delivery-air pressure output from delivery port 706 is at or above the brake-spring threshold value when one or more of (1) the control-air pressure of control-air input into control port 704 is below a valve minimum threshold (which begins valve 712 to close), or (2) the control-air pressure of control-air input into control port 704 is between the valve minimum threshold and a valve maximum threshold (which causes valve 712 to close). In situations where the valve 712 is "closing" (e.g., between full-open where valve 712 is against valve stop 716, and full-close when valve 712 is against valve seat 726), the spring-brake-chamber spring 216 may be applying a variable pressure on the brakes. Thus, valve spring 728 may make this "closing" time less (or the pressure difference, between valve-open and valve-closed configurations of valve 712, less) by assisting in closing and/or opening of valve 712. Table 1, below, summarizes inputs and outputs of inversion valve 602 and impact on brake status of spring brakes 626(1,D), 626(2,D), 626(1,P), and 626(2,P).

TABLE 1

| Inversion Valve I/O impact on Spring Brakes | | | |
| Supply-Air Input Pressure (PSI) | Control-Air Input Pressure (PSI) | Delivery Output Pressure (PSI) | Brake Status |
| --- | --- | --- | --- |
| 0 - brake-spring threshold value | N/A | N/A | Full brake pressure applied |
| brake-spring threshold value - ∞ | 0 - valve minimum threshold | Supply-Air Input Pressure | released |
| brake-spring threshold value - ∞ | valve minimum threshold - valve maximum threshold | Supply-Air Input Pressure - 0 based on valve 712 position | Applied at variable pressure based on delivery output |
| brake-spring threshold value - ∞ | valve maximum threshold - ∞ | 0 | Full brake pressure applied |

As discussed above, trailer brake controller 550 may be an electronic-based controller. For example, trailer brake controller 550 may be a proportional pressure control valve setup. The actuation position from the treadle valve could be read electronically and used to generate an electrical signal to a proportional pressure control valve (for example varying the pressure, 0-130 psi via a 0-10 v input) that would send a signal to the emergency brakes 526. The proportional pressure control valve would replace the inversion valve 602, but would be controlled via a PLC/controller reading signals from the treadle valve 614 and/or emergency brake control 616.

Figure 8:
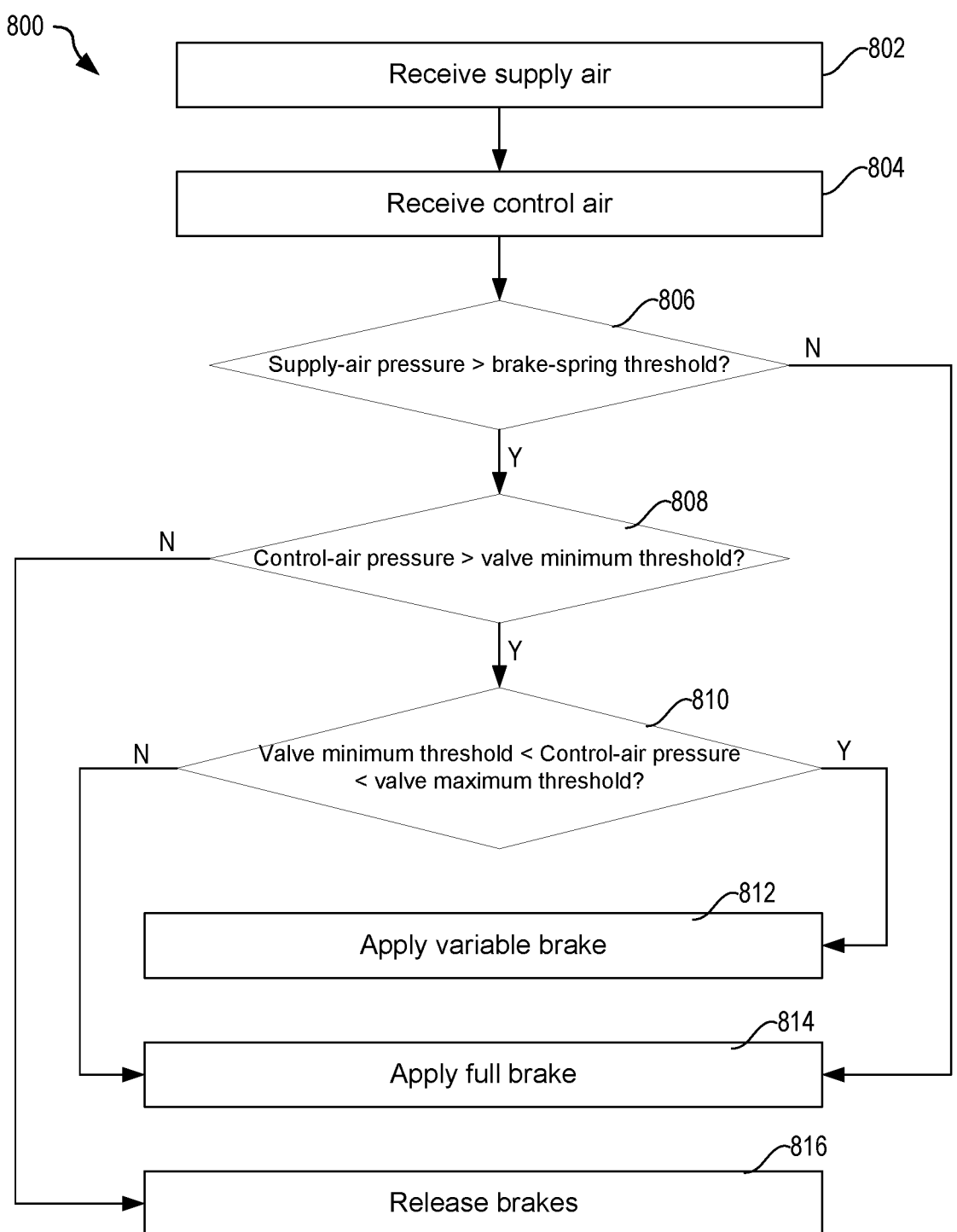
FIG. 8 shows a method for controlling trailer brakes using a single air line, in embodiments.

FIG. 8 shows a method 800 for controlling trailer brakes using a single air line, in embodiments. Method 800 is implemented by tractor 502, such as via operation of the trailer brake controller 550, in an embodiment. Method 800 may implement the air brake system 600 of FIG. 6, but it should be appreciated that it may be implemented using electronic controllers and supply signals, instead of pneumatic air signals, without departing from the scope hereof. For example, instead of using air-signals, an electronic delivery output signal may be transmitted to a compressor/air system on the trailer that controls air pressure input into the spring brake chamber portion 204.

In block 802, method 800 receives supply signal. In one embodiment of block 802, inversion valve 602 receives supply air from the output of emergency brake control 616 that indicates whether or not the emergency brakes are to be released, or not. In embodiments where method 800 is implemented electronically, the supply signal may be an electronic output from an emergency brake controller that indicates whether the emergency brakes are to be released, or not.

In block 804, method 800 receives control signal. In one embodiment of block 802, inversion valve 602 receives control air from the output of treadle valve 614. In embodiments where method 800 is implemented electronically, the control signal may be an electronic output from a service brake controller (e.g., in place of treadle valve 614) that indicates whether the emergency brakes are to be released, or not.

Block 806 is a decision. In block 806, method 800 determines if the supply signal is above a brake-spring threshold. In one embodiment of block 806, supply air received at control port 704 of inversion valve 602 is above the threshold required to compress spring-brake-chamber spring 216 and thus release the spring brakes 626(1,D), 626(2,D), 626(1,P), and 626(2,P) at the trailer 504. If the supply signal is above a brake-spring threshold, then method 800 proceeds with block 808. Else, method 800 proceeds with block 814 and full brakes are applied via spring force from spring-brake-chamber spring 216 applied via pushrod 210. In one embodiment of block 814, full brakes are applied because no air is being output from delivery port 706 of inversion valve 602.

Block 808 is a decision. In block 808, method 800 determines if the control signal is above a valve minimum threshold. In one embodiment of block 808, inversion valve 602 is configured such that valve 712 begins to close when control air supplied at control port 704 is above a valve minimum threshold. If the control signal is above a valve minimum threshold, then method 800 proceeds with block 810. Else, method 800 proceeds with block 816 and the brakes are released. In one embodiment of block 816, the brakes are released because supply air received at supply port 702 of inversion valve 602 is routed to the output of delivery port 706.

Block 810 is a decision. In block 810, method 800 determines if the control signal is between the valve minimum threshold and a valve maximum threshold. Block 810 implements the configuration of inversion valve 602 where valve 712 variably closes based on the pressure at control port 704. In such embodiments, valve spring 728 may make this "closing" time less (or the pressure difference, between valve-open and valve-closed configurations of valve 712, less) by assisting in closing and/or opening of valve 712. In block 810, where the valve 712 is between the valve stop position 716 (full open position of valve 712) and valve seat 726 (full closed position of valve 712), then the brakes are variably applied because spring-brake-chamber spring 216 is not fully compressed/decompressed. If the control signal is between the valve minimum threshold and a valve maximum threshold, then method 800 implements block 812 and variable brakes are applied based on the position of valve 712, for example. Else, the valve maximum threshold must be met (because block 808 already determined that the valve minimum threshold is met), which means valve 712 is fully closed or the electronic signal indicates to fully apply brakes, and block 814 is implemented.

Combination of Features

Features described above as well as those claimed below may be combined in various ways without departing from the scope hereof. The following enumerated examples illustrate some possible, non-limiting combinations:

(A1) A system for controlling trailer brakes includes: an emergency brake control that activates and releases an emergency brake of a trailer; a treadle valve that receives input from a pedal to output a control air that activates and releases a service brake of a tractor; and a trailer brake controller coupled between the emergency brake control and a trailer connection that, in response to a control signal based off the treadle valve, outputs a delivery signal capable of controlling the emergency brake.

(A2) In embodiments of (A1), the trailer connection being a trailer supply line connection.

(A3) In either of embodiments (A1) or (A2), the trailer brake controller being an inversion valve; and the control signal being at least part of the control air output from the treadle valve.

(A4) In any of embodiments (A1)-(A3), the inversion valve including a supply port for receiving supply-air output from the emergency brake control.

(A5) In any of embodiments (A1)-(A4), the inversion valve including a control port for receiving at least some of the control air.

(A6) In any of embodiments (A1)-(A5), the inversion valve including a delivery port for outputting the delivery signal.

(A7) In any of embodiments (A1)-(A6), the trailer brake controller being a proportional pressure control valve.

(A8) In any of embodiments (A1)-(A7), the trailer, the emergency brake control, the treadle valve, and the trailer brake controller being components of the tractor coupled to the trailer.

(A9) In any of embodiments (A1)-(A8), only a single air line is coupled between the tractor and the trailer.

(A10) In any of embodiments (A1)-(A9), the emergency brake control, the treadle valve, and the trailer brake controller being components of the tractor.

(A11) In any of embodiments (A1)-(A10), the tractor being an autonomous yard vehicle.

(A12) In any of embodiments (A1)-(A11), the emergency brake being a spring brake.

(B1) A method for controlling a brake of a trailer includes: receiving a supply air output from an emergency brake control of a tractor; receiving a control air output from a treadle valve of the tractor; when the control air is below a valve minimum threshold, outputting a delivery air similar to the supply air from the tractor to the trailer to release the brake; and when the control air is above the valve minimum threshold, outputting the delivery air at a reduced pressure to apply the brake.

(B2) The embodiment (B1) further including further comprising, when the supply air is below a brake spring threshold, apply the brake.

(B3) Either of embodiments (B1) or (B2) further including the method includes coupling a single air line between the tractor and the trailer.

(B4) In any of embodiments (B1)-(B3), the method being performed at an autonomous yard vehicle.

(B5) In any of embodiments (B1)-(B4), the apply the brake including delivering the delivery air from the tractor to the trailer.

(B6) In any of embodiments (B1)-(B5), the receiving the supply air including receiving the supply air at a supply port of an inversion valve, the receiving the control air including receiving the control air at a control port of the inversion valve, the inversion valve coupled between the emergency brake control and a trailer connection.

(B7) In any of embodiments (B1)-(B6), the apply the brake comprising, applying a variable brake when the control air is above the valve minimum threshold and below a valve maximum threshold.

(B8) In any of embodiments (B1)-(B7), the valve minimum threshold defining when a valve within an inversion valve begins to close.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for controlling trailer brakes, comprising:
   an emergency brake control that activates and releases an emergency brake of a trailer;
   a treadle valve that receives input from a pedal to output a control air that activates and releases a service brake of a tractor; and
   a trailer brake controller having an inversion valve configured to receive supply air from the emergency brake control and the control air from the treadle valve and to output a delivery signal to an emergency brake line of the trailer to control the emergency brake proportionally to the control signal without requiring a connection to a trailer service brake line of the trailer.

2. The system of claim 1, the trailer connection being a trailer supply line connection.

3. The system of claim 1, the control signal being at least part of the control air output from the treadle valve.

4. The system of claim 3, the inversion valve including a supply port for receiving supply-air output from the emergency brake control.

5. The system of claim 3, the inversion valve including a control port for receiving at least some of the control air.

6. The system of claim 3, the inversion valve including a delivery port for outputting the delivery signal.

7. The system of claim 1, the trailer brake controller being a proportional pressure control valve.

8. The system of claim 1, the system further including the trailer, the emergency brake control, the treadle valve, and the trailer brake controller being components of the tractor coupled to the trailer.

9. The system of claim 8, wherein only a single air line is coupled between the tractor and the trailer.

10. The system of claim 1, the emergency brake control, the treadle valve, and the trailer brake controller being components of the tractor.

11. The system of claim 10, the tractor being an autonomous yard vehicle.

12. The system of claim 1, the emergency brake being a spring brake.

13. A method for controlling a brake of a trailer, comprising:
   receiving a supply air output from an emergency brake control of a tractor;
   receiving a control air output from a treadle valve of the tractor;
   when the control air is below a valve minimum threshold, outputting a delivery air similar to the supply air from the tractor to the trailer to release the brake; and
   when the control air is above the valve minimum threshold, outputting the delivery air at a reduced pressure to apply the brake;

wherein the delivery air is output to an emergency brake line of the trailer to control the emergency brake proportionally to the control air pressure, and wherein the brake is controlled without using a trailer service brake line of the trailer.

14. The method of claim 13, further comprising, when the supply air is below a brake spring threshold, apply the brake.

15. The method of claim 13, further comprising coupling a single air line between the tractor and the trailer.

16. The method of claim 13, the method being performed at an autonomous yard vehicle.

17. The method of claim 13, the apply the brake including delivering the delivery air from the tractor to the trailer.

18. The method of claim 13, the receiving the supply air including receiving the supply air at a supply port of an inversion valve, the receiving the control air including receiving the control air at a control port of the inversion valve, the inversion valve coupled between the emergency brake control and a trailer connection.

19. The method of claim 13, the apply the brake comprising, applying a variable brake when the control air is above the valve minimum threshold and below a valve maximum threshold.

20. The method of claim 13, the valve minimum threshold defining when a valve within an inversion valve begins to close.

* * * * *